(12) United States Patent
Weaver et al.

(10) Patent No.: US 9,617,399 B2
(45) Date of Patent: Apr. 11, 2017

(54) HIGH FREQUENCY WELDABLE POLYOLEFIN COMPOSITIONS CONTAINING ZEOLITES

(71) Applicant: Dow Global Technologies LLC, Midland, MI (US)

(72) Inventors: Laura B. Weaver, Johnson City, TN (US); Yushan Hu, Pearland, TX (US); Jose M. Rego, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 85 days.

(21) Appl. No.: 14/367,709

(22) PCT Filed: Dec. 21, 2012

(86) PCT No.: PCT/US2012/071101
§ 371 (c)(1),
(2) Date: Jun. 20, 2014

(87) PCT Pub. No.: WO2013/096705
PCT Pub. Date: Jun. 27, 2013

(65) Prior Publication Data
US 2015/0018478 A1  Jan. 15, 2015

Related U.S. Application Data

(60) Provisional application No. 61/578,269, filed on Dec. 21, 2011.

(51) Int. Cl.
| | |
|---|---|
| *C08J 5/12* | (2006.01) |
| *B29C 65/14* | (2006.01) |
| *C08J 9/00* | (2006.01) |
| *C08J 5/18* | (2006.01) |
| *C08L 23/14* | (2006.01) |
| *C08L 23/08* | (2006.01) |
| *C08L 23/06* | (2006.01) |
| *C08K 3/34* | (2006.01) |
| *C08L 51/06* | (2006.01) |
| *C08L 23/30* | (2006.01) |
| *B29C 65/04* | (2006.01) |
| *B29C 65/00* | (2006.01) |
| *B29K 23/00* | (2006.01) |
| *B29K 509/00* | (2006.01) |
| *B29K 509/02* | (2006.01) |

(52) U.S. Cl.
CPC ............... *C08J 5/121* (2013.01); *B29C 65/14* (2013.01); *C08J 5/18* (2013.01); *C08J 9/0061* (2013.01); *C08K 3/34* (2013.01); *C08L 23/06* (2013.01); *C08L 23/0815* (2013.01); *C08L 23/14* (2013.01); *C08L 23/30* (2013.01); *C08L 51/06* (2013.01); *B29C 65/04* (2013.01); *B29C 66/71* (2013.01); *B29K 2023/00* (2013.01); *B29K 2023/0633* (2013.01); *B29K 2023/08* (2013.01); *B29K 2023/083* (2013.01); *B29K 2509/00* (2013.01); *B29K 2509/02* (2013.01); *C08J 2323/08* (2013.01); *C08J 2323/14* (2013.01)

(58) Field of Classification Search
CPC ... C08J 5/121; C08J 9/0061; C08J 5/18; C08J 2323/14; C08J 2323/08; B29C 65/14; B29C 65/04; B29C 66/71; C08L 23/14; C08L 23/0815; C08L 23/06; C08L 51/06; C08L 23/30; C08K 3/34; B29K 2509/00; B29K 2509/02; B29K 2023/08; B29K 2023/0633; B29K 2023/00; B29K 2023/083
USPC ........................................................ 524/450
See application file for complete search history.

(56) References Cited

U.S. PATENT DOCUMENTS

| | | | |
|---|---|---|---|
| 3,336,173 | A | 8/1967 | Renfroe et al. |
| 3,645,992 | A | 2/1972 | Elston |
| 4,076,698 | A | 2/1978 | Anderson et al. |
| 4,661,299 | A | 4/1987 | Thorsrud |
| 5,272,210 | A | 12/1993 | Galante |
| 5,272,236 | A | 12/1993 | Lai et al. |
| 5,278,272 | A | 1/1994 | Lai et al. |
| 5,504,172 | A | 4/1996 | Imuta et al. |
| 6,054,544 | A | 4/2000 | Finlayson et al. |
| 6,136,923 | A | 10/2000 | Cheung et al. |

(Continued)

FOREIGN PATENT DOCUMENTS

| | | |
|---|---|---|
| EP | 149782 A2 | 7/1985 |
| GB | 2177974 A | 2/1987 |

(Continued)

OTHER PUBLICATIONS

Dow Global Technologies LLC European Application No. 12818856.2 Communication 161(1) dated Jul. 29, 2014.

(Continued)

*Primary Examiner* — Angela C Scott

(57) ABSTRACT

A dielectrically-heatable inventive method employing a polyolefin-based formulation including at least 5 weight percent of a zeolite, ion exchanged with a Group I or II metal, wherein the zeolite includes 21 or less wt % of water, based on zeolite weight, measured as LOI at 575° C. for 1 hour; and a base polymer selected from certain homogeneously branched linear or substantially linear ethylene/α-olefin or homogeneously branched propylene/?-olefin copolymers copolymers, provided that the base polymer has a melt temperature less than 100° C. This formulation may be used to prepare a high frequency (HF) welded article having improved failure and welding strength properties, particularly a weld strength in excess of 7 lb/in (1.23 N/mm).

8 Claims, No Drawings

(56) References Cited

U.S. PATENT DOCUMENTS

| | | |
|---|---|---|
| 6,335,410 B1 | 1/2002 | Finlayson et al. |
| 6,525,157 B2 | 2/2003 | Cozewith et al. |
| 6,558,809 B1 | 5/2003 | Kelch et al. |
| 6,723,810 B2 | 4/2004 | Finlayson et al. |
| 6,960,635 B2 | 11/2005 | Stevens et al. |
| 8,420,760 B2 | 4/2013 | Hughes et al. |
| 2003/0113563 A1 | 6/2003 | Buhring |
| 2004/0077791 A1* | 4/2004 | Issum ............ B29C 65/04 525/185 |
| 2004/0116600 A1 | 6/2004 | Buhring |

FOREIGN PATENT DOCUMENTS

| | | |
|---|---|---|
| JP | 10219048 A | 8/1998 |
| JP | 2001-106839 A | 4/2001 |
| WO | 00/01745 A1 | 1/2000 |
| WO | 02088229 A1 | 11/2002 |

OTHER PUBLICATIONS

PCT/US2012/071101,; International Search Report and Written Opinion of the International Searching Authority mailed Mar. 20, 2013.

PCT/US2012/071101, International Preliminary Report on Patentability mailed Jul. 3, 2014.

Randall, Rev. Micromole. Chem. Phys., 1989, C29 (2&3), p. 285-297).

Rudin, A., Modern Methods of Polymer Characterization, John Wiley & Sons, New York (1991) pp. 103-112.

Zimm, B.H. and Stockmayer, W.H., J. Chem. Phys., 17, 1301(1949).

* cited by examiner

HIGH FREQUENCY WELDABLE POLYOLEFIN COMPOSITIONS CONTAINING ZEOLITES

BACKGROUND OF THE INVENTION

1. Field of the Invention

The invention relates to the field of welding of polyolefin-based articles. More particularly, it relates to a method of welding certain polyolefin-based articles by dielectric heating, wherein the articles exhibit properties improvements.

2. Background of the Art

Dielectric heating provides a method of contactless, direct, volumetric heating of dielectric materials, which are defined as materials that are capable of absorbing electromagnetic energy and which are also very poor electrical conductors. This is achieved by the application of an alternating electric field generated at the given frequency range to the dielectric material. The dielectric loss factor, also known as the dielectric loss index, is a measure of the energy loss in a material and is indicative of how well that material can be heated in the high frequency, alternating electric field. If a material has a relatively high dielectric loss index, it may be well-suited for subjection to dielectric heating. In such a case dielectric heating offers a clean and controllable process that eliminates problems associated with the application of direct heat to a variety of materials. Thus, the process has been found to be economically attractive for use in certain commercial and industrial manufacturing processes. Dielectric heating is typically carried out using radio frequency (RF) waves (3 kHz to 300 GHz), which include microwaves (300 MHz to 300 GHz). Together these wave ranges are referred to as high frequency (HF) waves.

One application of dielectric heating is referred to as radio frequency (RF) welding or sealing, also referred to as high frequency (HF) welding or sealing. In this application at least one surface of a sheet or film of a suitably lossy material (i.e., having a relatively high dielectric loss index) is welded or sealed, either to another surface of the same sheet or face of another sheet or film, in order to fabricate an article of some type. Suitably lossy materials may include those containing functional groups having dipole moments that are responsive to the high frequency electromagnetic waves. Examples of this may include certain specific polymers, such as polyvinyl chloride. Unfortunately, however, chlorinated compounds may present environmental or toxicological challenges that manufacturers would like to avoid.

Researchers have tried to find means to make a normally non-lossy material suitable for dielectric heating by incorporating some proportion of a second, RF responsive material therein. In International Publication No. WO/2002/088229 the dielectric heating of thermoplastic compositions included incorporating a molecular sieve with at least one interpolymer described as comprising (i) polymer units derived from at least one aliphatic olefin monomer having from 2 to 20 carbon atoms; and (ii) polymer units derived from (a) at least one vinyl or vinylidene aromatic monomer, or (b) from at least one sterically hindered aliphatic or cycloaliphatic vinyl or vinylidene monomer, or (c) from a combination of at least one vinyl or vinylidene aromatic monomer and at least one sterically hindered aliphatic or cycloaliphatic vinyl or vinylidene monomer, and optionally, (d) polymer units derived from at least one ethyleneically unsaturated polymerizable monomer other than that derived from (a), (b) or (c). An example thereof would be an ethylene-styrene interpolymer.

Another disclosure addressing use of zeolites is Japanese Patent Application No. 10-219048, which describes HF weldable polypropylene compositions consisting of fine metal oxide particles, ion-substituted zeolite, and polypropylene. The ion-substituted zeolite, in which a portion or all of the exchangeable ions are replaced with ammonium ions and silver ions, is used as a nucleating agent and chlorine scavenger. European Patent Application No. 193 902 proposes to use zinc oxide, bentonite clay, or crystalline and amorphous alkali or alkaline earth metal aluminosilicates as HF sensitizers for high molecular weight, high density polyethylene or ultrahigh molecular weight polyethylene. It is taught therein that the radio frequency sensitizers have to be essentially dried prior to use. European Patent No. 149 782 discloses compositions comprising silane-grafted polyolefins and a crystalline zeolite. The compositions are shapeable into articles which can be cross-linked after shaping by exposure to humidity and/or microwaves.

In fact, some of the most widely used thermoplastic polymers, such as polyethylene, polystyrene and polypropylene, are known to be insufficiently lossy to permit efficient dielectric heating. Other researchers have tried to make HF weldable compositions by combining such non-lossy olefins with polar acrylate esters or vinyl acetates. See UK Patent Application No. 2 177 974. Still another involves using blends of propylene-ethylene copolymers and an ethylene-alkyl acrylate copolymer. See International Patent Application WO 94/12569. International Application No. WO 00/69629 discloses HF weldable films made from a blend of a non-polar olefin polymer and a polar copolymer with carbon monoxide (CO). U.S. Pat. No. 3,336,173 discloses HF weldable polyethylene and polypropylene compositions obtained by the incorporation of long chain synthetic polyamide resin. U.S. Pat. No. 6,136,923 discloses thermoplastic compositions of $\alpha$-olefin monomers with one or more vinylidene aromatic monomers and/or one or more hindered aliphatic or cycloaliphatic vinylidene monomers blended with polyvinyl chloride.

In view of the above, there is still a need for polymer compositions which are suitable as substitute materials for chlorine containing polymers, particularly polyvinyl chloride (PVC) or chlorinated polyvinyl chloride (CPVC), which can be dielectrically heated. In particular, there is a need for such polymer compositions which can be formed into HF weldable structures, including, for example, a film a sheet, a foam, a profile, fibers, a molding, or a fabricated article.

Furthermore, there is also a need for a material that has desirable appearance and also acceptable or desirable mechanical properties. Such properties are frequently defined as requiring a weld failure that is cohesive in nature, and a weld strength for a part having a 10 mil (0.254 millimeter) thickness that is greater than 5 pounds per inch (lb/in, 0.88 Newtons per millimeter, N/mm), preferably greater than 7 lb/in (1.23 N/mm), preferably under welding conditions including less than or equal to 6 seconds welding time and certain optimized radio frequency welding conditions including power ranging from 80 to 100 percent (%).

SUMMARY OF THE INVENTION

In one embodiment, the invention provides an improvement in a method of forming a polyolefin-based article that includes (a) incorporating into a polyolefin formulation a filler that is capable of being excited by a high frequency electromagnetic field; (b) forming a substrate from the polyolefin formulation, the substrate having at least one surface; and (c) subjecting the surface of the polyolefin substrate to the high frequency electromagnetic field under conditions such that the substrate is welded to a second surface of the polyolefin substrate or to a surface of a second polyolefin substrate to form a polyolefin-based article; wherein the improvement comprises (1) including in the polyolefin formulation a zeolite that is ion exchanged with sodium, calcium, or potassium, in an amount of at least 5 weight percent, based on the weight of the polyolefin formulation; and (2) employing as a base polymer in the polyolefin formulation a polyolefin selected from the group consisting of (a) a homogeneously branched, linear or substantially linear ethylene/α-olefin copolymer having a density from 0.865 to 0.905 grams per cubic centimeter (g/cm$^3$) and a melt index (measured at 190° C. at 2.13 kilograms (kg)) from 0.5 to 30 grams per 10 minutes (g/10 min); (b) a homogeneously branched propylene/α-olefin copolymer having a density from 0.863 to 0.885 g/cm$^3$ and a melt flow rate (measured at 230° C. at 2.13 kg) from 2 to 30 g/10 min; (c) a combination thereof; provided that the base polymer has a melting temperature below 100° C.; and further provided that the polyolefin substrate exhibits as properties a cohesive welding failure and a weld strength for a 10 mil (0.254 millimeter) thickness that is greater than 7 pounds per inch (lb/in, 1.23 Newtons per millimeter (N/mm)) at a welding time of less than or equal to 6 seconds, to form a polyolefin-based article.

In another embodiment the invention provides a high frequency welded polyolefin article prepared from the polyolefin formulation selected from the group consisting of medical devices selected from pressure cuffs and stabilization devices; inflatables selected from toys, watercraft, cushioning and furniture; sheetings selected from awnings, banners, signs, tents, tarpaulins, and liners for pools, ponds or landfills; book bindings; and carriers selected from sporting bags and backpacks.

DETAILED DESCRIPTION OF THE EMBODIMENTS

The invention enables rapid, successful, commercial scale welding of a variety of polyolefin substrates, including but not limited to sheets, films and molded substrates, including injection and compression molded substrates, to serve as or to use to produce polyolefin articles having improved properties of various kinds. In general such as produced by incorporating together a polyolefin-based polymer having a distinguishing rheology, as determined by differential scanning calorimetric (DSC) analysis and a zeolite including a particular type of ion exchange selection including water in a limited amount. The polyolefin-based polymer will be described first.

The polyolefin-based polymer used in the inventive compositions may comprise at least a polymeric material designated herein as Component A, but can also contain additional polymeric materials that are labeled here as optional Component B, Component C, Component D, and Component E. In addition, the composition comprises the HF-responsive filler that is denoted herein as Component F.

Component A may be selected from, in one non-limiting example, one or more ethylene/-α-olefin copolymers having a density from 0.865 g/cm$^3$ to 0.905 g/cm$^3$, and a molecular weight distribution from 1.1 to 3.5, preferably 1.5 to 3.5, more preferably 1.8 to 3.0, still more preferably 1.8 to 2.5. Such Component A may be a semi-crystalline polymer that has a melting point of less than 120° C. More desirably the melting point is less than 110° C., and most preferably less than 100° C. In another embodiment, the melting point may be from 25° C., preferably 40° C., more preferably 59° C., to 100° C., more preferably to 85° C.

Such is desirably homogeneously branched or substantially linear. The terms "homogeneous" and "homogeneously-branched" are used in reference to an ethylene/α-olefin copolymer, in which the α-olefin comonomer is randomly distributed within a given polymer molecule, and all of the polymer molecules have the same or substantially the same comonomer/ethylene ratio. The homogeneously branched ethylene/α-olefin copolymers include homogeneously branched linear ethylene/α-olefin copolymers, and homogeneously branched substantially linear ethylene/α-olefin copolymers.

Included among the homogeneously branched linear ethylene/α-olefin copolymers are ethylene copolymers, which lack long chain branching (or measurable amounts of long chain branching), but do have short chain branches, derived from the comonomer polymerized into the copolymer, and which comonomer is homogeneously distributed, both within the same polymer chain, and between different polymer chains. That is, homogeneously branched linear ethylene/α-olefin copolymers lack long chain branching, just as is the case for the linear low density ethylene/α-olefin copolymers, and can be made using "uniform branching distribution" polymerization processes, as described, for example, by Elston in U.S. Pat. No. 3,645,992. Commercial examples of homogeneously branched linear ethylene/α-olefin copolymers include TAFMER polymers supplied by the Mitsui Chemical Company, and EXACT polymers supplied by the ExxonMobil Chemical Company.

The homogeneously branched substantially linear ethylene/α-olefin copolymers are described in, for example, U.S. Pat. Nos. 5,272,236; 5,278,272; 6,054,544; 6,335,410 and 6,723,810; each fully incorporated herein by reference. The substantially linear ethylene/α-olefin copolymers are those in which the comonomer is randomly distributed within a given polymer molecule, and in which all of the polymer molecules have the same or substantially the same comonomer/ethylene ratio. In addition, the substantially linear ethylene/α-olefin copolymers have long chain branching (chain branch has more carbon atoms than a branched formed by the incorporation of one comonomer into the polymer backbone). The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. Polymers within this group may be included among the ENGAGE™ and AFFINITY™ products available from The Dow Chemical Company. In contrast to the homogeneously branched substantially linear ethylene/α-olefin copolymers, the homogeneously branched linear ethylene/α-olefin copolymers lack measurable or demonstrable long chain branches.

The homogeneously branched substantially linear ethylene/α-olefin copolymers form a unique class of homogeneously branched ethylene polymers. They differ from the class of homogeneously branched linear ethylene/α-olefin copolymers, described by Elston in U.S. Pat. No. 3,645,992, and, moreover, they are not in the same class as conventional heterogeneous, "Ziegler-Natta catalyst polymerized" linear ethylene/α-olefin copolymers (for example, LLDPE, ULDPE and VLDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers, and ethylene vinyl acetate (EVA) copolymers.

The homogeneously branched, substantially linear ethylene/α-olefin copolymers have excellent processability, even though they have a relatively narrow molecular weight distribution. Surprisingly, the melt flow ratio ($I_{10}/I_2$), according to ASTM D 1238-04, of the substantially linear ethylene/α-olefin copolymers can be varied widely, and essentially independently of the molecular weight distribution ($M_w/M_n$ or MWD). This surprising behavior is completely contrary to conventional homogeneously branched linear ethylene/α-olefin copolymers, such as those described, for example, by Elston in U.S. Pat. No. 3,645,992, and heterogeneously branched "conventional Ziegler-Natta polymerized" linear ethylene-/α-olefin copolymers, such as those described, for example, by Anderson et al., in U.S. Pat. No. 4,076,698. Unlike the substantially linear ethylene/α-olefin copolymers, linear ethylene/α-olefin copolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}$C nuclear magnetic resonance ($^{13}$C NMR) spectroscopy, using, for example, the method of Randall (Rev. Micromole. Chem. Phys., 1989, C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

The homogeneously branched ethylene/α-olefin copolymers may have a melt flow rate in the range of from 0.1 to 30 g/10 minutes, measured in accordance with ASTM D-1238 (at 190° C./2.16 kg). All individual values and subranges from 0.1 to 30 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/α-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The homogeneously branched ethylene/α-olefin copolymers will preferably have a single melting peak, as measured using Differential Scanning calorimetry (DSC), in contrast to heterogeneously branched ethylene/α-olefin copolymers, which have two or more melting peaks, due to the heterogeneously branched polymer's broad short chain branching distribution.

The selected ethylene/α-olefin copolymer has a desired crystallinity in the range of from at least 10 percent by weight (a heat of fusion of at least 29 joules per gram, J/g) to 38 percent by weight (a heat of fusion of less than 110 J/g). All individual values and subranges from 10 percent by weight (a heat of fusion of at least 29 J/g) to 38 percent by weight (a heat of fusion of less than 110 J/g) are included herein and disclosed herein; for example, the crystallinity can be from a lower limit of 10 percent by weight (a heat of fusion of at least 29 J/g), 13 percent (a heat of fusion of at least 38 J/g), or 18 percent by weight (a heat of fusion of at least 53 J/g) to an upper limit of 38 percent by weight (a heat of fusion of less than 110 J/g), 34 percent by weight (a heat of fusion of less than 100 J/g), 31 percent by weight (a heat of fusion of less than 90 J/g).

For example, the ethylene/α-olefin copolymer may have a crystallinity in the range of from at least 13 percent by weight (a heat of fusion of at least 38 J/g) to 36 percent by weight (a heat of fusion of less than 105 J/g); or in the alternative, from at least 16 percent by weight (a heat of fusion of at least 47 J/g) to 34 percent by weight (a heat of fusion of less than 100 J/g).

The crystallinity is measured via the Differential Scanning calorimetry (DSC) method, which measures the heats of fusion of the melting temperature of the base polymers. The preferred method, as used to obtain the heats of fusion for the materials in the Examples and Comparative Examples hereinafter, is to employ a TA Instruments C11000 DSC equipped with an RCS cooling accessory and an auto sampler. A nitrogen purge gas flow of 50 milliliters per minute (mL/min) is used. About 3 to 10 milligrams (mg) of material is cut, accurately weighed, and placed in a light aluminum pan (approximately 50 mg) which is later crimped shut. The thermal behavior of the sample is investigated with the following temperature profile: The sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 190° C. at a 10° C./min heating rate. The cooling and second heating curves are recorded. For the heat of fusion measurements for the polyolefinic resins, as known and routinely performed by skilled practitioners in this area, the baseline for the calculation is drawn from the flat initial section prior to the onset of melting and extends to the end of melting for the second heating curve.

The ethylene/α-olefin copolymer comprises units derived from ethylene and polymeric units derived from one or more α-olefin comonomers. Exemplary comonomers utilized to manufacture the ethylene/α-olefin copolymer are $C_2$, and $C_4$ to $C_{10}$ α-olefins; for example, $C_2$, $C_4$, $C_6$ and $C_8$ α-olefins.

In another example, Component A may be a propylene-based copolymer. Such copolymer may be a semi-crystalline polymer and has a melting point of less than 120° C. More desirably the melting point is less than 110° C., and most preferably less than 100° C. In another embodiment, the melting point may be from 25° C., preferably 40° C., more preferably 59° C., to 100° C., more preferably to 85° C.

In one particular embodiment, the propylene-based elastomer is a propylene/α-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/α-olefin copolymer may have a melt flow rate in the range of from 0.1 to 25 g/10 minutes, measured in accordance with ASTM D-1238 (at 230° C./2.16 kg). All individual values and subranges from 0.1 to 35 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 35 g/10 minutes, 20 g/10 minutes, 18 g/10 minutes, 15 g/10 minutes, 10 g/10 minutes, 8 g/10 minutes, or 5 g/10 minutes. For example, the propylene/α-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/α-olefin copolymer has a crystallinity in the range of from at least 1 percent by weight (a heat of fusion of at least 2 joules per gram, J/g) to 40 percent by weight (a heat of fusion of less than 66 J/g). All individual values and subranges from 1 percent by weight (a heat of fusion of at least 2 J/g) to 40 percent by weight (a heat of fusion of less than 66 J/g) are included herein and disclosed herein; for example, the crystallinity can be from a lower limit of 1 percent by weight (a heat of fusion of at least 2 J/g), or 3 percent (a heat of fusion of at least 5 J/g) to an upper limit of 40 percent by weight (a heat of fusion of less than 66 J/g), 30 percent by weight (a heat of fusion of less than 540 J/g), 15 percent by weight (a heat of fusion of less than 24.8 J/g) or 7 percent by weight (a heat of fusion of less than 11 J/g).

For example, the propylene/α-olefin copolymer may have a crystallinity in the range of from at least 4 percent by weight (a heat of fusion of at least 7 J/g) to 30 percent by weight (a heat of fusion of less than 50 J/g); or in the alternative, the propylene/α-olefin copolymer may have a crystallinity in the range of from at least 7 percent by weight (a heat of fusion of at least 12 J/g) to 30 percent by weight (a heat of fusion of less than 50 J/g); or in the alternative, the propylene/α-olefin copolymer may have a crystallinity in the range of from at least 12 percent by weight (a heat of fusion of at least 20 J/g) to 30 percent by weight (a heat of fusion of less than 50 J/g). The crystallinity is measured via Differential scanning calorimetry (DSC) method. The propylene/α-olefin copolymer comprises units derived from propylene and polymeric units derived from one or more α-olefin comonomers. Exemplary comonomers utilized to manufacture the propylene/α-olefin copolymer are $C_2$, and $C_4$ to $C_{10}$ α-olefins; for example, $C_2$, $C_4$, $C_6$ and $C_8$ α-olefins.

The propylene/α-olefin copolymer comprises from 1 to 40 percent by weight of units derived from one or more α-olefin comonomers. All individual values and subranges from 1 to 40 weight percent are included herein and disclosed herein; for example, the weight percent of units derived from one or more α-olefin comonomers can be from a lower limit of 1, 3, 4, 5, 7, or 9 weight percent to an upper limit of 40, 35, 30, 27, 20, 15, 12, or 9 weight percent. For example, the propylene/α-olefin copolymer comprises from 1 to 35 percent by weight of units derived from one or more α-olefin comonomers; or in the alternative, the propylene/α-olefin copolymer comprises from 1 to 30 percent by weight of units derived from one or more α-olefin comonomers; or in the alternative, the propylene/α-olefin copolymer comprises from 3 to 27 percent by weight of units derived from one or more α-olefin comonomers; or in the alternative, the propylene/α-olefin copolymer comprises from 3 to 20 percent by weight of units derived from one or more α-olefin comonomers; or in the alternative, the propylene/α-olefin copolymer comprises from 3 to 15 percent by weight of units derived from one or more α-olefin comonomers.

The propylene/α-olefin copolymer has a (MWD), defined as weight average molecular weight divided by number average molecular weight ($M_w/M_n$), of 3.5 or less. In another alternative the MWD is preferably from 1.1 to 3.5, more preferably from 1.5 to 3.5, still more preferably from 1.8 to 3.0, and most preferably from 1.8 to 2.5.

Such propylene/α-olefin copolymers are further described in details in the U.S. Pat. Nos. 6,960,635 and 6,525,157, incorporated herein by reference. Such propylene/α-olefin copolymers are commercially available from The Dow Chemical Company, under the tradename VERSIFY™, or from ExxonMobil Chemical Company, under the tradename VISTAMAXX™.

In one embodiment, the propylene/α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein in regard to propylene/α-olefin copolymers, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/α-olefin copolymers are further described in details in the U.S. Provisional Patent Application No. 60/988,999 and International Patent Application No. PCT/US08/082,599, each of which is incorporated herein by reference.

Where the base polymer is ethylene-based, the density is preferably from 0.860 to 0.900 g/cm$^3$, with a melt flow index $I_2$ (as measured according to ASTM D 1238) of from 0.5 to 30 g/10 min at 190° C. In that case the concentration of Component A may range from 60 to 95 wt %.

Where the base polymer is propylene-based, the density is preferably from 0.860 to 0.880 g/cm$^3$, and the melt flow rate (MFR, as measured according to ASTM D 1238) desirably from 2 to 30 g/10 min at 230° C. In that case the concentration of Component A may range from 60 to 95 wt %.

Component B, which is optional to the invention, may be selected from the same group as Compound A, but preferably differs from Component A in at least one property selected from density (as measured according to ASTM D 792), melt flow index ($I_2$) (according to ASTM D 1238), melt flow rate (MFR) (according to ASTM D 1238), and melting temperature (according to DSC). For example, in one embodiment Component B may be ethylene-based and have a melt flow index $I_2$ of 15 g/10 min at 230° C., while Component A may have a melt flow index $I_2$ of 3 g/10 min at 230° C. The combination of Component A and B may be customized to provide desirable levels of processability for extrusion and injection molding. Furthermore, it is preferred that, where Component A is ethylene-based, Component B is also ethylene-based; and where Component A is propylene-based, Component B is also propylene-based.

In relative amount it is important that the amount of Component B be less than or equal to Component A, and that therefore Component A is present in the formulation in or equal to the greatest amount. Additional formulation polymers may include an optional Component C, which may be a third polyolefin polymer, in an amount ranging from 0 to 30 wt %, preferably from 5 to 30 wt %, still more preferably from 5 to 25 wt %, based on the formulation as a whole. Such may be selected from, in non-limiting embodiments, polypropylene, random copolymer polypropylene, high density polyethylene, linear low density polyethylene and combinations thereof, provided that low density polyethylene (LDPE) is not selected.

The formulation may further comprise an also-optional Component D, which may be present in an amount ranging from 0 to 30 wt %, preferably from 5 to 30 wt %, still more preferably from 5 to 25 wt %, based on the formulation as a whole. This Component D may be selected from, in non-limiting embodiments, ethylene vinyl acetate (EVA) or another relatively polar polymers such as chlorinated polyethylene, ethylene vinyl acetate copolymer, maleic anhydride grafted polyolefin or maleic anhydride copolymer with a polyolefin (e.g., those containing from 0.05 to 1.00 wt % of a maleic anhydride moiety), ethylene-acrylic acid copolymer, ethyl acrylate grafted polyolefin, oxidized polyolefin, and combinations of any of these. Finally, the formulation may include from 0 to 5 wt %, based on the formulation as a whole, of an optional Component E, which may be selected from additives such as antioxidants; ultraviolet light absorbers; slip agents; anti-blocking agents; other process aids; fire retardancy additives; fillers such as talc; colorants such as titanium dioxide, carbon black and pigments; combinations thereof; and the like.

The last, and key, component of the HF-weldable formulation of the invention is an amount, preferably from 5 to 20 wt %, of at least one zeolite, herein designated as (required) Component F. The zeolite is defined herein as a molecular sieve providing for HF responsiveness. Such molecular sieve materials are inorganic solid materials characterized by a porous structure which is formed by channels or pores. The pores may be non-uniform with varying pore diameters, or uniform with constant pore diameters. The porous structure provides for a large internal surface area with adsorptive capacity for molecular species which are capable of entering the pores, such as water molecules. The pores may penetrate essentially the entire volume of the solid material.

Molecular sieve materials may be amorphous or crystalline. Examples of molecular sieve materials suitable for the purpose of the invention include zeolites, which are alternatively defined as synthetic or natural crystalline silicates or aluminosilicates having channels of diameters less than 1.2 nanometers (nm). Zeolites may also be referred to as framework aluminosilicates, because the framework is based on a three-dimensional network of [(Al,Si)$_4$] tetrahedral which are linked to each other (at the corners) by shared oxygen atoms. Substitution of aluminum for silicon generates a charge imbalance, requiring the inclusion of a cation. In the hydrated form, zeolites of the most important aluminosilicate variety, as used in the present invention, may be represented by the formula

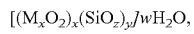

$$[(M_xO_2)_x(SiO_z)_y]wH_2O,$$

wherein M represents a cation of valence n, x is the number of aluminum-based tetrahedral and charge balancing cations in the unit cell, y is the number of silicon-based tetrahedra in the unit cell, and w is the number of water molecules in the zeolite pores. The bracketed part of the formula [(AlO$_2$)x(SiO$_2$)$_y$] represents the anionic framework composition. The sum (x+y) is the total number of tetrahedral in the unit cell. The ratio y/x may vary depending on the type of zeolite and typically has values of from about 1 to about 6, depending upon the structure. Occlusion of AlO$_2$-anions may result in a ratio of below 1.

The framework contains channels and voids which can be occupied by the cations M and water molecules. The water molecules may be reversibly removed, for example, by the application of heat. The cation M may be a Group IA element or a Group IIA element, that is, it may be an alkali metal cation or an alkaline-earth metal. In preferred but non-limiting embodiments, Typically, M may be selected from the group consisting of sodium, potassium, calcium, magnesium, strontium and barium, more preferably sodium, potassium, and calcium.

Suitable synthetic zeolites include those within the family of Type X, 3A, 4A and 5A. The specifically exemplified zeolite grades have a pore size in the range of from about 0.3 nm to about 0.8 nm and a particle size in the range of from about 2 microns (μm) to about 16 μm. For the purpose of the present invention, the zeolites may advantageously be used as (commercially) supplied, in particular in the supplied form and hydration state. Prior treatment or activation, e.g., to remove adsorbed water, is not considering necessary. Advantageously, the zeolites are used in powder form.

It is within the scope of the present invention that more than one zeolite may be used in the inventive compositions, i.e., a mixture of two or more different zeolites.

Once the zeolite has been selected and the polyolefin-based polymer as defined has been prepared using appropriate polymerization techniques (or commercially obtained), they are combined to form the inventive formulation. A preferred method of preparing the inventive compositions is to include the zeolite (or mixture of zeolites) in a total amount of at least 5 weight percent (wt %), preferably from 5 wt % to 20 wt %, more preferably from 6 wt % to 17 wt %, and most preferably from 7 wt % to 14 wt %, based on the weight of the composition as a whole. It may be incorporated using any means conventionally useful to ensure formation of a uniform dispersion of the zeolite throughout the polyolefin-based polymer, for example, impeller mixing, rotary mixing, Banbury mixers, twin screw extruders and other. The resulting blend is then given a desired configuration, e.g., a sheet, film, or compression or injection molded article, as appropriate, in which it may then be carried into the high frequency electromagnetic field for dielectric heating including, as desired, HF welding or HF sealing of one or more such configurations useful to prepare an intermediary or a final fabricated article.

One key to the invention is that water is also included, in an amount relative to the zeolite weight, ranging from 1 wt % to 21 wt %, preferably from 2 wt % to 19 wt %, more preferably from 3 wt % to 18 wt %, and most preferably from 3 wt % to 17 wt %. This water is generally present within or absorbed onto the zeolite as supplied, but it can also be ensured and controlled by drying the zeolite to the required level. The amount of water is measured as Loss on Ignition (LOI), which is weight loss at 575° C. for 1 hour.

In general the HF-weldable compositions of the present invention are novel formulations wherein the melt temperature ($T_m$) of base polymers may, in preferred embodiments, range from 59° C. to less than 120° C., more preferably less than 110° C., and still more preferably less than 100° C. These formulations may be conveniently formed into extruded films or sheets or injection molded articles having desirable properties such as Ultimate Tensile Strengths ranging from 1600 to 4000 pounds per square inch (psi, 11.0 to 27.6 megapascals, MPa), according to ASTM D 638; Ultimate Tensile Elongation ranging from 300 to 1200%, measured according to ASTM D 638; Elmendorf Tear, Type B ranging from 200 to 500 grams per mil [thickness] (g/mil); weld strength ranging from 5 lb/in (0.88 N/mm) to 25 lb/in (4.38 N/mm) for a 10 mil thick film; and a visual appearance that may be considered to range from "good," defined as showing no bubbles, to "fair," defined as showing only a few small bubbles. In addition, failure type is, in many embodiments, cohesive. Furthermore, the final film or sheet articles may pass a stress whitening test, as described hereinbelow.

EXAMPLES

Materials used in the Examples and Comparative Examples are shown in Table 1. Functional polyolefin materials are selected and designated as having the properties shown in Table 2. Zeolites are selected and designated as having the properties shown in Table 3.

TABLE 1

Polyolefinic materials used in Examples and Comparative Examples.

| Code | Commercial Name | Density (g/cm3) | Melting Point (° C.) | Heat of Fusion ΔHf (J/g) | MI (2.16 kg @ 190° C.) or MFR* (2.16 kg @ 230° C.) | Main monomer | Co-monomer | Chain structure |
|---|---|---|---|---|---|---|---|---|
| PO1 | LDPE 535I, Dow Chemical | 0.918 | 108 | 120 | 2.3 | Ethylene | None | LDPE (highly branched) |
| PO2 | ENGAGE ™ 8200, Dow Chemical | 0.870 | 59 | 55 | 5 | Ethylene | 1-Octene | Homogeneous, substantially linear (SLEP) |
| PO3 | VERSIFY ™ 2200, Dow Chemical | 0.876 | 82 | 40 | 2* | Propylene | Ethylene | Homogeneous, linear (HLIN) |
| PO4 | VERSIFY ™ 3200, Dow Chemical | 0.876 | 85 | 40 | 8* | Propylene | Ethylene | Homogeneous, linear (HLIN) |
| PO5 | AFFINITY ™ PL 1850G, Dow Chemical | 0.902 | 98 | 104 | 3 | Ethylene | 1-Octene | Homogeneous, substantially linear (SLEP) |

*MFR (2.16 kg @ 230° C.)

TABLE 2

Functional polyolefinic materials used in Examples and Comparative Examples.

| Code | Name | Density (g/cm³) | Melting Point (° C.) | MI (2.16 kg @ 190° C. or MFR* (2.16 kg @ 230° C.) | Functionality |
|---|---|---|---|---|---|
| EVA | ELVAX ™ 460, DuPont | 0.941 | 88 | 2.5 | 18 wt %, Vinyl Acetate |
| OXD-PE | LICOWAX ™ PED 521, AmeriLubes, L.L.C. | 0.94-0.96 | — | 350 cps, viscosity at 120° C. (DIN 53018)** | Oxidized polyethylene |
| MAH-g-PE WAX | Honeywell A-C 575A, Honeywell | 0.92 | 106 | 4200 cps, viscosity at 140° C. (Brookfield)** | Maleic anhydride |
| MAH-g-SLEP1* | Functional polyolefin plastomer based on ethylene/octene copolymer, 0.870 g/cm³, 6700 cps, (viscosity at 350° F., ASTM D3236),** Dow Chemical | — | — | 15000 cps, viscosity at 350° F. (ASTM D3236)** | 1.0 wt % Maleic anhydride, SLEP adhesive resin |
| MAH-g-SLEP2* | AMPLIFY ™ GR 216 Functional Polymer, Dow Chemical | — | — | 1.25 | 0.8 wt % Maleic anhydride |

*SLEP refers to homogeneous, substantially linear ethylene plastomer
**Viscosity supplied by manufacturer

TABLE 3

Zeolites used in Examples and Comparative Examples.

| Zeolite Designation | Supplier | Zeolite | Tradename | Part. Size/ Microns (μm) | LOI/wt % |
|---|---|---|---|---|---|
| Zeolite 1 | TRICAT | 13X | TRICAT 13X-5 | <3 | 21 |
| Zeolite 2 | TRICAT | 5A | TRICAT 5A | n/a | 21 |
| Zeolite 3 | TRICAT | 4A-5 | TRICAT 4A-5 | <3 | 21 |
| Zeolite 4 | TRICAT | 4A | TRICAT 4A | 3-5 | 21 |
| Zeolite 5 | TRICAT | 3A-60 | TRICAT 3A | 3-5 | 21 |
| Zeolite 6 | UOP | 4A | n/a | 1-10 | <2 |
| Zeolite 7 | Zeochem | 13X | Purmol 13 | n/a | <2 |
| Zeolite 8 | Zeochem | 4A | Purmol 4 | n/a | <2 |
| Zeolite 9 | PQ Corp | 4A | ADVERA™ | 2-4 | 21 |
| Zeolite 10 | TRICAT | 5A | TRICAT 5A | n/a | 5 |
| Zeolite 11 | TRICAT | 5A | TRICAT 5A | n/a | 10 |
| Zeolite 12 | TRICAT | 5A | TRICAT 5A | n/a | 15 | n/a means not applicable

Evaluation Methods

Methods used for evaluation are shown in Table 4.

TABLE 4

Film properties test methods.

| Property | Method | Comments |
|---|---|---|
| Density, g/cm$^3$ | ASTM D 792 | — |
| Melt Index, g/10 min | ASTM D 1238 | (2.16 kg @ 190° C.) |
| Melt Flow Rate, g/10 min | ASTM D 1238 | (2.16 kg @ 230° C.) |
| DSC Melting Peak, ° C. | — | Rate 10° C./min (2$^{nd}$ heat) |
| Ultimate Tensile Strength, MPa | ASTM D 638 | (508 mm/min) |
| Ultimate Tensile Elongation, % | ASTM D 638 | (508 mm/min) |
| Tear Elmendorf - Type B, g/mil | ASTM D1922 | — |
| Weld strength, lb/in | ASTM F88-A | — |
| Sample Appearance | Visual | Good: No bubbles<br>Fair: Few, small bubbles<br>Poor: Many bubbles |
| Stress Whitening | Visual | Fail: If white mark is observed upon folding<br>Pass: If white mark is not observed upon folding |

Additional film properties testing information is included hereinbelow.

Tear Strength: The tear strength of films is measured according to the Elmendorf Tear Strength method, as promulgated under American Society for Testing and Materials (ASTM) D1922. Constant radius specimens are used. At least 15 specimens are tested for each sample. The tear strength is measured as the average force required to propagate tearing through the film. The tear strength is measured only in machine direction (MD) for the tape films.

Tensile Properties: The tensile properties of the films are measured in both machine direction (MD) and cross machine direction (CD), according to the ASTM D638. The stress-strain behavior of the films is determined by elongating the specimen and measuring the load carried by the specimen at a rate of 2 inches per minute (in/min) and at least 5 specimens are tested per each sample.

Stress Whitening: The extruded tape or cast film sheet is subjected to a 180° folding, then pinched with fingers to add pressure. If the test causes a stress whitening mark, then the sheet is considered as fail. If no stress whitening mark is observed, the sheet is considered as having passed the test.

Weld Strength of RF Welded Film: The RF welded film tabs (4 in.×9 in.) are cut into 1 inch wide stripes in the weld cross direction. These strips are then pulled by an Instron™ machine to measure the weld strength according to ASTM F88-A. The speed of testing is 2 in/min. The weld strength is measured in triplicate to obtain statistically reliable data. The Peak Load during pulling is recorded as "weld strength" for each sample and the corresponding failure types (cohesive or adhesive) are recorded as well.

Film quality: The film quality is assessed visually. Films are categorized into two groups: poor, and good.

Procedure:

Twin Screw Extrusion Compounding

Mixing of components is done with a Twin Screw Extruder (TSE) Coperion ZSK-26 with a 26 mm screw diameter and a 60 L/D ratio. Zeolites are fed through a side arm through. The barrel temperature profile shown in Table 5 is used during the compounding process. The extruder is operated at 200 revolutions per minute (rpm). The total throughput used is 30 pounds per hour (lb/hr). The strand is water-bath cooled and strand-cutter pelletized in pellets.

TABLE 5

Twin screw extruder barrel temperature profile.

| | Barrel Temperature Profile | | | | | | | | | | | | | |
|---|---|---|---|---|---|---|---|---|---|---|---|---|---|---|
| Zone | 2 | 3 | 4 | 5 | 6 | 7 | 8 | 9 | 10 | 11 | 12 | 13 | 14 | Die |
| Set Point, ° C. | 25 | 25 | 130 | 130 | 130 | 130 | 130 | 130 | 130 | 130 | 130 | 130 | 130 | 130 |

The compounded pellets are then extruded with a Haake single extruder (¾ in. diameter and 25 L/D) attached to a tape/slot die into tape films. The typical extrusion condition is applied (~50 rpm and barrel temperature profile from 95° C. to 160° C. The extrudate is taken off on a chill rolls system controlled at about 15° C. The finished tape films are collected on a wind-up system and the dimension of the tapes are from approximately 3.5 in. to approximately 4 in. wide and from approximately 10 mil to approximately 15 mil thick.

A cast film is also prepared by extrusion. In this procedure, a portion of the compounded pellets re also extruded with a Collin Cast Film Line (30 mm and 25 L/D single screw extruder). Before the cast film extrusion, the pellets are dried overnight to eliminate the moisture trapped on the rough surface of the pellets, which causes air bubbles in the films. The typical extrusion condition is listed in the following Table 6 and the extruder is running at 50 rpm with 4.7 kilograms per hour (kg/hr) throughput. The final thicknesses of the cast films are 10 mil and 15 mil, respectively.

The power level setting of the Callanan RF welder is adjustable from 0% to 100%. The typical setting for power employed herein is from 80% to 90%. The typical weld time is from 2 to 4 seconds (sec), with 0.5 sec preheat time and 1 sec cool time.

The Clayton setting is adjusted to optimize the resonance frequency of the work piece. The maximum power from the generator (output frequency at 27.12 MHz) is coupled with the resonance frequency of the work piece to determine the Clayton setting. In this study, the Clayton setting ranges from 20 to 22.

Examples 1-7 and Comparative Examples A-O

Series of Example and Comparative samples are prepared, wherein polymers are combined with zeolites according to Table 7 and Table 8, using the compounding and film-forming methods described in the Procedure, and then HF-welded according to the given Clayton settings, powers and times shown, with the resulting weld strengths and failure types (Table 7 and Table 8), as well as the final properties for the non-welded films as shown in Table 8.

None of the Comparative Examples A-O in Table 7 meets the combination of the following four (4) property requirements: Film appearance (good); weld strength greater than 5 lb/in (~1.05 N/mm); cohesive delamination; and weld time less than or equal to 6 sec. In contrast, the Example 1-7 formulations, which include homogeneous linear polyolefins blended with 10 to 12.5 wt % zeolite, meet the combination of these 4 property requirements. The inventive Examples 1-7 also demonstrate excellent tear strength.

TABLE 6

Cast film line conditions.

| | Inlet | Zone | Zone | Zone | Zone | Adapter 1 | Adapter 2 | Die | Die | Die |
|---|---|---|---|---|---|---|---|---|---|---|
| Temperature (° C.) | 65 | 150 | 165 | 175 | 180 | 180 | 180 | 180 | 180 | 180 |

HF Welding

The extruded tape films and cast films are welded with a Callanan Radio Frequency (RF) Welder. The power output of the Callanan RF Welder is 2 KW and the operation/generator frequency is 27.12 megahertz (MHz). The seal bar dimension is ½ inch, and the die dimension is 8 inches. The tape films are sealed in the machine direction.

During the HF welding process, the films are placed between the seal bar and bottom metal plate with a RF Heat Sealing Buffers material (Sealguard™ 815 from Oliner Fibre) underneath the film sample. The seal bar is brought down to the bottom metal plate via a pneumatic cylinder at 30 psi (~0.21 MPa) pressure, and the films are pressed between the bar and the plate when the RF field is applied.

TABLE 7

Sample constituents and weld performance of LDPE/SLEP/Zeolite blends (Extruded tape thickness 10 mil, Clayton setting = 20)

| Sample Code | Zeolite Type | Zeolite Conc/% | PO1 Conc/% | PO2 Conc/% | Sample appearance | Welding Power (%) | Welding Time (s) | Weld strength (lb/in) | Failure type |
|---|---|---|---|---|---|---|---|---|---|
| Comp Ex A | Zeolite 1 | 10 | 36 | 54 | Good | 100 | 6 | 6.4 | Adhesive |
| Comp Ex B | Zeolite 2 | 10 | 36 | 54 | Fair | 100 | 4 | 9.1 | Cohesive |
| | Zeolite 2 | 10 | 36 | 54 | Fair | 100 | 6 | 11.1 | Cohesive |
| Comp Ex C | Zeolite 3 | 8 | 37 | 55 | Good | 100 | 2 | 2.6 | Adhesive |
| | Zeolite 3 | 8 | 37 | 55 | Good | 100 | 6 | 6.0 | Adhesive |
| | Zeolite 3 | 8 | 37 | 55 | Good | 100 | 10 | 7.2 | Adhesive |
| Comp Ex D | Zeolite 3 | 10 | 36 | 54 | Fair | 100 | 6 | 7.3 | Adhesive |
| | Zeolite 3 | 10 | 36 | 54 | Fair | 100 | 10 | 8.6 | Adhesive |
| Comp Ex E | Zeolite 3 | 12 | 35 | 53 | Fair | 100 | 2 | 5.5 | Adhesive |
| | Zeolite 3 | 12 | 35 | 53 | Fair | 100 | 6 | 9.3 | Cohesive |
| | Zeolite 3 | 12 | 35 | 53 | Fair | 100 | 10 | 9.6 | Cohesive |
| Comp Ex F | Zeolite 4 | 10 | 36 | 54 | Fair | 100 | 6 | 5.9 | Adhesive |
| | Zeolite 4 | 10 | 36 | 54 | Fair | 100 | 10 | 7.5 | Adhesive |
| Comp Ex G | Zeolite 5 | 10 | 36 | 54 | Fair | 100 | 6 | 9.1 | Adhesive |
| Comp Ex H | Zeolite 6 | 8 | 37 | 55 | Poor | 100 | 6 | 8.5 | Adhesive |
| Comp Ex I | Zeolite 6 | 10 | 36 | 54 | Poor | 100 | 2 | 5.2 | Adhesive |
| | Zeolite 6 | 10 | 36 | 54 | Poor | 100 | 6 | 9.7 | Cohesive |
| Comp Ex J | Zeolite 6 | 12 | 35 | 53 | Poor | 100 | 6 | 10.2 | Cohesive |

TABLE 7-continued

Sample constituents and weld performance of LDPE/SLEP/Zeolite blends (Extruded tape thickness 10 mil, Clayton setting = 20)

| Sample Code | Zeolite Type | Zeolite Conc/% | PO1 Conc/% | PO2 Conc/% | Sample appearance | Welding Power (%) | Welding Time (s) | Weld strength (lb/in) | Failure type |
|---|---|---|---|---|---|---|---|---|---|
| Comp Ex K | Zeolite 7 | 10 | 36 | 54 | Good | 100 | 6 | 5.1 | Adhesive |
|  | Zeolite 7 | 10 | 36 | 54 | Good | 100 | 10 | 7.5 | Adhesive |
| Comp Ex L | Zeolite 8 | 8 | 37 | 55 | Good | 100 | 6 | 6.0 | Adhesive |
| Comp Ex M | Zeolite 8 | 10 | 36 | 54 | Fair | 100 | 2 | 3.5 | Adhesive |
|  | Zeolite 8 | 10 | 36 | 54 | Fair | 100 | 6 | 8.0 | Adhesive |
|  | Zeolite 8 | 10 | 36 | 54 | Fair | 100 | 10 | 9.0 | Cohesive |
| Comp Ex N | Zeolite 8 | 12 | 35 | 53 | Fair | 100 | 6 | 9.5 | Cohesive |
| Comp Ex O | Zeolite 9 | 10 | 36 | 54 | Fair | 100 | 6 | 7.7 | Adhesive |

TABLE 8

Sample constituents and properties of Homogeneous Linear Polyolefin/Zeolite Blends (Extruded tape thickness 10 mils, Clayton setting = 20)

| Sample Code | Inventive Ex 1 | Inventive Ex 2 | Inventive Ex 3 | Inventive Ex 4 | Inventive Ex 5 | Inventive Ex 6 | Inventive Ex 7 |
|---|---|---|---|---|---|---|---|
| Zeolite Type | Zeolite 2 | Zeolite 2 | Zeolite 8 | Zeolite 8 | Zeolite 10 | Zeolite 11 | Zeolite 12 |
| Zeolite Conc/wt % | 10 | 12.5 | 10 | 12.5 | 10 | 10 | 10 |
| PO3 Conc/wt % | 45 | 43.75 | 45 | 43.75 | — | — | — |
| PO4 Conc/wt % | 45 | 43.75 | 45 | 43.75 | — | — | — |
| PO5 Conc/wt % | — | — | — | — | 90 | 90 | 90 |
| Sample appearance | Good | Good | Good | Good | Good | Good | Good |
| Film thickness/mils | 10 | 10 | 10 | 10 | 10 | 10 | 10 |
| Clayton setting | 20 | 20 | 20 | 20 | 20 | 20 | 20 |
| Power (%) | 90 | 90 | 90 | 90 | 80 | 80 | 80 |
| Time (sec) | 4 | 4 | 4 | 4 | 4 | 4 | 4 |
| Weld strength (lb/in) | 20.2 | 15.4 | 15.9 | 14.7 | 11.8 | 14.9 | 16 |
| Failure type | Cohesive | Cohesive | Cohesive | Cohesive | Cohesive | Cohesive | Cohesive |
| Tear Elmendorf - MD* (g/mil) | — | 271 | — | 255 | — | — | — |
| Tensile Strength - MD* (psi) | — | 2847 | — | 3053 | — | — | — |
| Tensile Elongation - MD* (%) | — | 517 | — | 510 | — | — | — |

*Measured on cast films; machine direction
— Indicates not measured

Examples 8-10 and Comparative Example P

A series of Examples 8-10 compounds and a Comparative Example P compound are prepared, wherein polymers are combined with zeolites according to Table 9 and the Procedure described hereinabove, formed into extruded films of designated thicknesses, HF welded according to the given Clayton settings, powers and times shown, and upon testing exhibit the weld strengths and failure types as shown in that Table 9.

Compared with Comparative Example P, adding small concentration of 3-10 wt % of a "functional" polymer, which by definition improves the weld strength. These functional polyolefins generally contains polar groups, including, but not limited to vinyl acetate copolymers, MAH grafted polyethylenes and oxidized polyethylene (i.e., from the group designated as optional Component D hereinabove).

TABLE 9

Sample constituents and properties of Homogeneous Linear Polyolefin/Zeolite blends containing functional polyolefin (Extruded tape thickness 10 mil, Clayton setting = 20)

| Sample Code | Comp Ex P | Inventive Ex 8 | Inventive Ex 9 | Inventive Ex 10 |
|---|---|---|---|---|
| Zeolite Type | Zeolite 8 | Zeolite 8 | Zeolite 8 | Zeolite 8 |
| Zeolite Conc/% | 10 | 10 | 10 | 10 |
| PO5 Conc/% | 90 | 80 | 87 | 87 |
| EVA Conc/% |  | 10 |  |  |
| MAH-g-PE |  |  | 3 |  |
| WAX Conc/% |  |  |  |  |
| OXD-PE Conc/% |  |  |  | 3 |
| Film appearance | Good | Good | Good | Good |
| Power (%) | 90 | 90 | 90 | 90 |
| Time (s) | 4 | 4 | 4 | 4 |
| Weld strength (lb/in) | 6.7 | 9.3 | 9.6 | 12.8 |
| Failure type | Adhesive | Cohesive | Cohesive | Cohesive |

Examples 11-14 and Comparative Examples Q-T

A series of exemplary and comparative compounds is prepared, wherein polymers are combined with zeolites according to Table 10 formed into extruded films of designated thicknesses with the resulting stress whitening property.

Comparative Examples Q and R, consisting of homogeneous linear polyolefin and 10 wt % zeolite, fail the stress whitening test. Adding 10 wt % EVA (Comp. Ex. S) or 5 wt % MAH-g-SLEP1 (Comp. Ex. T) also fails stress whitening test. However, surprisingly, adding 10 to 30 wt % MAH-g-SLEP2 passes stress whitening test (Inventive Examples 11-14).

TABLE 10

Sample constituents and stress whitening properties of Homogeneous Linear Polyolefin/Zeolite blends (film thickness 10 mil)

| Sample Code | Comp Ex Q | Comp Ex R | Comp Ex S | Comp Ex T | Inventive Ex 11 | Inventive Ex 12 | Inventive Ex 13 | Inventive Ex 14 |
|---|---|---|---|---|---|---|---|---|
| Zeolite Type | Zeolite 8 | Zeolite 8 | Zeolite 8 | Zeolite 8 | Zeolite 8 | Zeolite 8 | Zeolite 8 | Zeolite 8 |
| Zeolite Conc/% | 10 | 10 | 10 | 10 | 10 | 10 | 15 | 15 |
| PO3 Conc/% | 45 | | | | 40 | | 27.5 | |
| PO4 Conc/% | 45 | | | | 40 | | 27.5 | |
| PO5 Conc/% | | 90 | 80 | 85 | | 80 | | 55 |
| EVA Conc/% | | | 10 | | | | | |
| MAH-g-SLEP1 Conc/% | | | | 5 | | | | |
| MAH-g-SLEP2 Conc/% | | | | | 10 | 10 | 30 | 30 |
| MAH moiety in formulation/% | n/a | n/a | n/a | 0.05 | 0.08 | 0.08 | 0.24 | 0.24 |
| Film appearance | Good | Good | Good | Good | Good | Good | Good | Good |
| Stress whitening | Fail | Fail | Fail | Fail | Pass | Pass | Pass | Pass |

What is claimed is:

1. An improvement in a method of forming a polyolefin-based article that includes (a) incorporating into a polyolefin formulation a filler that is capable of being excited by a high frequency electromagnetic field; (b) forming a substrate from the polyolefin formulation, the substrate having at least one surface; and (c) subjecting the surface of the polyolefin substrate to the high frequency electromagnetic field under conditions such that the substrate is welded to a second surface of the polyolefin substrate or to a surface of a second polyolefin substrate to form a polyolefin-based article; wherein the improvement comprises (1) including in the polyolefin formulation a zeolite that is ion exchanged with sodium, calcium, or potassium, in an amount of at least 5 weight percent based on weight of the polyolefin formulation; and (2) employing as a base polymer in the polyolefin formulation a polyolefin selected from the group consisting of (a) a homogeneously branched, linear or substantially linear ethylene/α-olefin copolymer having a density from 0.865 to 0.905 grams per cubic centimeter and a melt index, measured at 190° C. at 2.16 kilograms, from 0.5 to 30 grams per 10 minutes; (b) a homogeneously branched propylene/α-olefin copolymer having a density from 0.863 to 0.885 grams per cubic centimeter and a melt flow rate, measured at 230° C. at 2.16 kilograms, from 2 to 30 grams per 10 minutes; (c) a combination thereof;

provided that the base polymer has a melting temperature below 100° C.; and further provided that the polyolefin substrate exhibits as properties a cohesive welding failure and a weld strength for a 10 mil (0.254 millimeter) thickness that is greater than 7 pounds per inch (1.23 Newtons per millimeter) at a welding time of less than or equal to 6 seconds, to form a polyolefin-based article.

2. The method of claim 1 wherein the polyolefin-based article is a polyolefin film or sheet, and the polyolefin film or sheet further exhibits at least one property selected from the absence of bubbles as seen upon visual inspection; the absence of stress whitening following folding at 180 degrees; or a combination thereof.

3. The method of claim 1 wherein the polyolefin formulation includes from 5 to 30 weight percent, based on the polyolefin formulation as a whole, of a polar polymer selected from ethylene vinyl acetate (EVA); chlorinated polyethylene; maleic anhydride grafted polyolefin; ethylene-acrylic acid copolymer; ethyl acrylate grafted polyolefin; oxidized polyolefin; or a combination thereof.

4. The method of claim 1 wherein the polyolefin formulation includes from 0.06 to 1.00 weight percent, based on the polyolefin formulation as a whole, of a maleic anhydride moiety.

5. The method of claim 1 wherein water is present in an amount from 3 weight percent to 17 weight percent, based on weight of the zeolite, and measured as Loss on Ignition (LOI), weight loss at 575° C. for 1 hour.

6. The method of claim 1 wherein the zeolite is a synthetic zeolite within the family of Type X, 3A, 4A or 5A.

7. The method of claim 1 wherein the synthetic zeolite is within the family of Type 4A or 5A.

8. The polyolefin article according to claim 1 selected from the group consisting of medical devices selected from pressure cuffs and stabilization devices; inflatables selected from toys, watercraft, cushioning and furniture; sheetings selected from awnings, banners, signs, tents, tarpaulins, and liners for pools, ponds or landfills; book bindings; and carriers selected from sporting bags and backpacks.

* * * * *